United States Patent
Wang et al.

(10) Patent No.: US 11,205,431 B2
(45) Date of Patent: Dec. 21, 2021

(54) METHOD, APPARATUS AND DEVICE FOR PRESENTING STATE OF VOICE INTERACTION DEVICE, AND STORAGE MEDIUM

(71) Applicant: Baidu Online Network Technology (Beijing) Co., Ltd., Beijing (CN)

(72) Inventors: Shasha Wang, Beijing (CN); Gang Zhang, Beijing (CN); Yawen Diao, Beijing (CN); Tianyu Wang, Beijing (CN); Hongyu Chen, Beijing (CN); Yuning Yang, Beijing (CN); Zongliang Wen, Beijing (CN); Qiang Ju, Beijing (CN)

(73) Assignees: BAIDU ONLINE NETWORK TECHNOLOGY (BEIJING) CO., LTD., Beijing (CN); SHANGHAI XIAODU TECHNOLOGY CO., LTD., Beijing (CN)

( * ) Notice: Subject to any disclaimer, the term of this patent is extended or adjusted under 35 U.S.C. 154(b) by 162 days.

(21) Appl. No.: 16/659,137

(22) Filed: Oct. 21, 2019

(65) Prior Publication Data
US 2020/0211551 A1      Jul. 2, 2020

(30) Foreign Application Priority Data

Jan. 2, 2019   (CN) .......................... 201910002528.5

(51) Int. Cl.
*G10L 15/00*       (2013.01)
*G10L 15/22*       (2006.01)
(Continued)

(52) U.S. Cl.
CPC .............. *G10L 15/22* (2013.01); *G06F 3/167* (2013.01); *G10L 15/1822* (2013.01);
(Continued)

(58) Field of Classification Search
CPC ..... H04L 5/14; H04L 5/16; H04L 5/18; G06F 3/02
See application file for complete search history.

(56) References Cited

U.S. PATENT DOCUMENTS

| 10,122,855 B1 | 11/2018 | Hernandez |
| 2007/0274297 A1* | 11/2007 | Cross, Jr. ................ G10L 15/30 370/356 |

(Continued)

FOREIGN PATENT DOCUMENTS

| CN | 104144192 A | 11/2014 |
| CN | 104572407 A | 4/2015 |

(Continued)

OTHER PUBLICATIONS

Search Report dated Mar. 23, 2020 for Chinese Application No. 201910025285.

(Continued)

*Primary Examiner* — Daniel Abebe
(74) *Attorney, Agent, or Firm* — Neal, Gerber & Eisenberg LLP (57) ABSTRACT

A method and apparatus for presenting a state of a voice interaction device are provided. The method includes: acquiring a current state of the voice interaction device; determining a current presentation mode corresponding to the current state, by searching a pre-stored correspondence relation between a state and a presentation mode according to the current state; and presenting the current state of the voice interaction device in the determined current presentation mode. In embodiments, a current state of a voice interaction device is presented to a user, and necessary usage recommendations and prompts are provided to a user, thereby improving user experience.

11 Claims, 4 Drawing Sheets

(51) Int. Cl.
*G06F 3/16* (2006.01)
*G10L 15/18* (2013.01)
*G10L 15/26* (2006.01)
*G10L 17/22* (2013.01)
*G10L 25/78* (2013.01)

(52) U.S. Cl.
CPC .............. *G10L 15/26* (2013.01); *G10L 17/22* (2013.01); *G10L 25/78* (2013.01); *G10L 2015/223* (2013.01)

(56) References Cited

U.S. PATENT DOCUMENTS

| | | | | |
|---|---|---|---|---|
| 2009/0296609 | A1* | 12/2009 | Choi | H04W 72/121 370/281 |
| 2017/0163403 | A1* | 6/2017 | Karjalainen | H04L 5/1438 |
| 2018/0005618 | A1 | 1/2018 | Liu | |
| 2018/0212746 | A1* | 7/2018 | Kazmi | H04L 1/1825 |
| 2020/0371682 | A1* | 11/2020 | Brody | G06F 3/04883 |

FOREIGN PATENT DOCUMENTS

| | | | |
|---|---|---|---|
| CN | 104583893 | A | 4/2015 |
| CN | 104679472 | A | 6/2015 |
| CN | 105912247 | A | 8/2016 |
| CN | 106227430 | A | 12/2016 |
| CN | 107145329 | A | 9/2017 |
| CN | 107240398 | A | 10/2017 |
| CN | 107564518 | A | 1/2018 |
| CN | 107665708 | A | 2/2018 |
| CN | 107895578 | A | 4/2018 |
| CN | 108449105 | A | 8/2018 |
| CN | 108509619 | A | 9/2018 |
| CN | 108510986 | A | 9/2018 |
| CN | 108520743 | A | 9/2018 |
| CN | 108538294 | A | 9/2018 |
| CN | 109003605 | A | 12/2018 |
| CN | 109005190 | A | 12/2018 |
| CN | 109036430 | A | 12/2018 |
| CN | 109040226 | A | 12/2018 |
| WO | 2005104581 | A1 | 11/2005 |

OTHER PUBLICATIONS

Notification of the First Office Action dated Mar. 31, 2020 for Chinese Application No. 2019100025285.
Notification of the Second Office Action for Chinese Patent Application No. 201900025285 dated Dec. 3, 2020.
Search Report for Chinese Patent Application dated Jan. 27, 2020.
Search Report dated Jan. 2, 2019 for Chinese Application No. 201910002547.8 (5 pages).
Office Action dated Sep. 2, 2019 for Chinese Application No. 201910002547.8 (17 pages).
Second Office Action dated Nov. 13, 2019 for Chinese Application No. 201910002547.8 (18 pages).
Search Report dated Dec. 13, 2019 for Chinese Application No. 2019100025533.
Notification of the First Office Action dated Dec. 23, 2019 for Chinese Application No. 201910002553.

* cited by examiner

METHOD, APPARATUS AND DEVICE FOR PRESENTING STATE OF VOICE INTERACTION DEVICE, AND STORAGE MEDIUM

CROSS-REFERENCE TO RELATED APPLICATION

This application claims priority to Chinese patent application No. 201910002528.5, filed on Jan. 2, 2019, which is hereby incorporated by reference in its entirety.

TECHNICAL FIELD

The present application relates to a field of voice interaction technology, and in particular to a method, apparatus and device for presenting a state of a voice interaction device, and a storage medium.

BACKGROUND

In the existing voice interaction technology, in a case where a voice interaction device is in a full duplex interactive state, a user may not know how to use a full duplex interactive function, or a user may not be aware of the purpose of a full duplex voice interaction, thereby resulting in poor user experience. The current voice interactive apparatus is incapable to present a state of a voice interaction device to a user in a good presentation mode and are incapable to provide the user with necessary usage recommendations and prompts, rendering poor user experience.

SUMMARY

A method and apparatus for presenting a state of a voice interaction device are provided according to embodiments of the present application, so as to at least solve the above technical problems in the existing technology.

In a first aspect, a method for presenting a state of a voice interaction device is provided according an embodiment of the present application. The method includes: acquiring a current state of the voice interaction device; determining a current presentation mode corresponding to the current state, by searching a pre-stored correspondence relation between a state and a presentation mode according to the current state; and presenting the current state of the voice interaction device in the determined current presentation mode.

In an implementation, the presenting the current state of the voice interaction device in the determined current presentation mode includes: presenting the current state by at least one of: playing a voice, playing a sound effect, displaying a static image associated with a full duplex interactive state, and displaying a dynamic image associated with the full duplex interactive state.

In an implementation, in a case where the current state is a half-duplex interactive state and a full duplex interactive function is to be introduced, the presenting the current state of the voice interaction device in the determined current presentation mode includes at least one of: playing a voice containing information for introducing the full duplex interactive function; displaying a static image for showing the full duplex interactive state; displaying a dynamic image for showing the full duplex interactive state; and playing a voice containing information for recommending the full duplex interactive function.

In an implementation, in a case where the current state is a full duplex interactive state, the presenting the current state of the voice interaction device in the determined current presentation mode includes: playing a voice indicating that the voice interaction device is in the full duplex interactive state, in a case where a time interval between the current moment and the moment when the last round of voice interaction ends is greater than a first preset threshold; and/or playing a sound effect indicating that the voice interaction device is in the full duplex interactive state, in a case where a time interval between the current moment and the moment when the last round of voice interaction ends is greater than a second preset threshold.

In an implementation, in a case where the current state is a full duplex interactive state, the presenting the current state of the voice interaction device in the determined current presentation mode further includes: displaying a static image and/or a dynamic image indicating that the voice interaction device is in the full duplex interactive state.

In an implementation, in a case where the current state is a full duplex interactive state, the presenting the current state of the voice interaction device in the determined current presentation mode further includes: displaying a dynamic image and/or a static image indicating a remaining time of the voice interaction device in the full duplex interactive state, based on the remain time.

In an implementation, in a case where the current state is switched from a full duplex interactive state to a half-duplex interactive state, the presenting the current state of the voice interaction device in the determined current presentation mode includes: playing a voice indicating that the full duplex interactive state ends; or playing a voice indicating that the full duplex interactive state ends and a new full duplex interaction is prepared to be initiated.

In a second aspect, an apparatus for presenting a state of a voice interaction device is provided according an embodiment of the present application. The apparatus includes: an acquirement module configured to acquire a current state of the voice interaction device; a searching module configured to determine a current presentation mode corresponding to the current state, by searching a pre-stored correspondence relation between a state and a presentation mode according to the current state; and a presentation module configured to present the current state of the voice interaction device in the determined current presentation mode.

In an implementation, the presentation module is configured to present the current state of the voice interaction device by at least one of: playing a voice, playing a sound effect, displaying a static image associated with a full duplex interactive state, and displaying a dynamic image associated with the full duplex interactive state.

In an implementation, in a case where the current state is a half-duplex interactive state and a full duplex interactive function is to be introduced, the presentation module is configured to present the current state of the voice interaction device by at least one of: playing a voice containing information for introducing the full duplex interactive function; displaying a static image for showing the full duplex interactive state; displaying a dynamic image for showing the full duplex interactive state; and playing a voice containing information for recommending the full duplex interactive function.

In an implementation, in a case where the current state is a full duplex interactive state, the presentation module is configured to: play a voice indicating that the voice interaction device is in the full duplex interactive state, in a case where a time interval between the current moment and the moment when the last round of voice interaction ends is greater than a first preset threshold; and/or play a sound effect indicating that the voice interaction device is in the full duplex interactive state, in a case where a time interval between the current moment and the moment when the last round of voice interaction ends is greater than a second preset threshold.

In an implementation, in a case where the current state is a full duplex interactive state, the presentation module is configured to display a static image and/or a dynamic image indicating that the voice interaction device is in the full duplex interactive state.

In an implementation, in a case where the current state is a full duplex interactive state, the presentation module is configured to display a dynamic image and/or a static image indicating a remaining time of the voice interaction device in the full duplex interactive state, based on the remain time.

In an implementation, in a case where the current state is switched from a full duplex interactive state to a half-duplex interactive state, the presentation module is configured to play a voice indicating that the full duplex interactive state ends; or play a voice indicating that the full duplex interactive state ends and a new full duplex interaction is prepared to be initiated.

In a third aspect, a device for presenting a state of a voice interaction device is provided according an embodiment of the present application. The functions of the device may be implemented by using hardware or by corresponding software executed by hardware. The hardware or software includes one or more modules corresponding to the functions described above.

In a possible embodiment, the device structurally includes a processor and a memory, wherein the memory is configured to store a program which supports the device in executing the above method for presenting a state of a voice interaction device. The processor is configured to execute the program stored in the memory. The device may further include a communication interface through which the device communicates with other devices or communication networks.

In a fourth aspect, a computer-readable storage medium for storing computer software instructions used for a device for presenting a state of a voice interaction device is provided. The computer-readable storage medium may include programs involved in executing of the method for presenting a state of a voice interaction device described above.

One of the above technical solutions has the following advantages or beneficial effects: in the method and apparatus for presenting a state of a voice interaction device according to embodiments of the present application, presentation modes corresponding to different states of a voice interaction device are pre-stored, after a voice interaction device is turned on, a current presentation mode corresponding to a current state of the voice interaction device is determined, and the current state of the voice interaction device is presented in the determined current presentation mode. In this way, a current state of a voice interaction device is presented to a user, and necessary usage recommendations and prompts are also provided to the user, thereby improving user experience.

The above summary is provided only for illustration and is not intended to be limiting in any way. In addition to the illustrative aspects, embodiments, and features described above, further aspects, embodiments, and features of the present application will be readily understood from the following detailed description with reference to the accompanying drawings.

BRIEF DESCRIPTION OF THE DRAWINGS

In the drawings, unless otherwise specified, identical or similar parts or elements are denoted by identical reference numerals throughout the drawings. The drawings are not necessarily drawn to scale. It should be understood these drawings merely illustrate some embodiments of the present application and should not be construed as limiting the scope of the present application.

DETAILED DESCRIPTION OF THE EMBODIMENTS

Hereafter, only certain exemplary embodiments are briefly described. As can be appreciated by those skilled in the art, the described embodiments may be modified in different ways, without departing from the spirit or scope of the present application. Accordingly, the drawings and the description should be considered as illustrative in nature instead of being restrictive.

A method and apparatus for presenting a state of a voice interaction device are provided according to embodiments of the present application. The technical solutions are described below in detail by means of the following embodiments.

Figure 1:
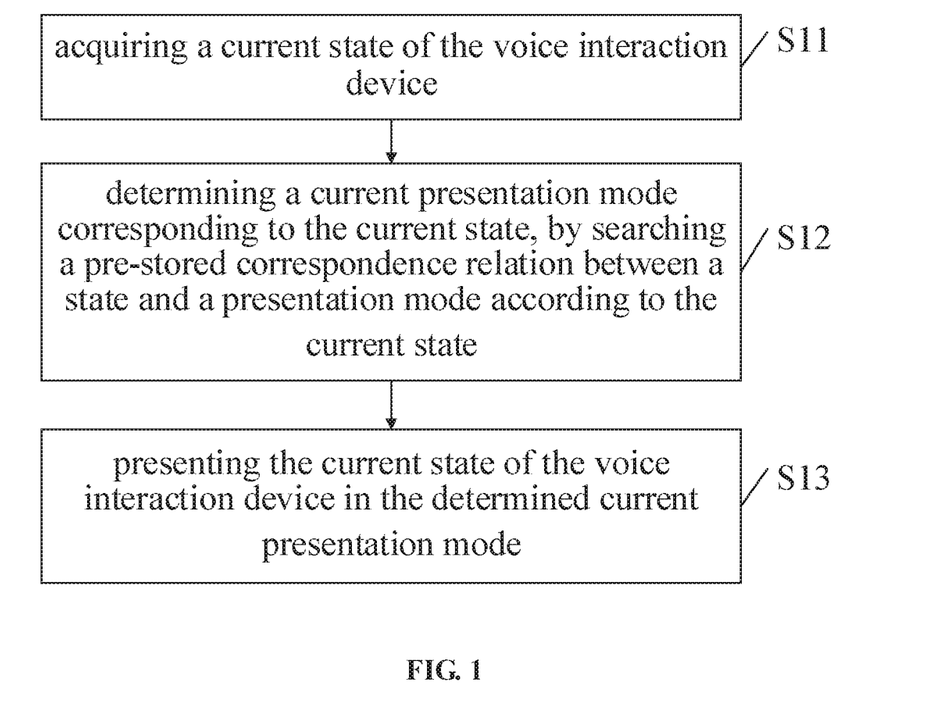
FIG. 1 is a flowchart showing an implementation of a method for presenting a state of a voice interaction device according to an embodiment of the present application.

FIG. 1 is a flowchart showing an implementation of a method for presenting a state of a voice interaction device according to an embodiment of the present application. The method includes: acquiring a current state of the voice interaction device at S11, determining a current presentation mode corresponding to the current state, by searching a pre-stored correspondence relation between a state and a presentation mode according to the current state at S12, and presenting the current state of the voice interaction device in the determined current presentation mode at S13.

The method according to an embodiment of the present application may be applied to a voice interaction device. The voice interaction device may include various devices having a voice interaction function, including but not limited to a smart speaker, a smart speaker with a screen, a television with a voice interaction function, a smart watch, and an onboard intelligent voice apparatus.

In a possible implementation, the presenting the current state of the voice interaction device in the determined current presentation mode includes: presenting the current state by at least one of: playing a voice, playing a sound effect, displaying a static image associated with a full duplex interactive state, and displaying a dynamic image associated with the full duplex interactive state.

Specific implementations of the above method are described in detail below by means of different scenarios.

Scenario 1: a current state of a voice interaction device is a half-duplex interactive state, and a full duplex interactive function is to be introduced. In this scenario, a user uses the full duplex interactive function for the first time, or the user is not familiar with the full duplex interactive function. Introductions and usage recommendations of the full duplex interactive function are provided to the user.

In the scenario, in a possible implementation, the presenting the current state of the voice interaction device in the determined current presentation mode at S13 may include at least one of: playing a voice containing information for introducing the full duplex interactive function; displaying a static image for showing the full duplex interactive state; displaying a dynamic image for showing the full duplex interactive state; and playing a voice containing information for recommending the full duplex interactive function.

In the above implementation, a user may be guided to participate in presenting the full duplex interactive function, when the voice interaction device introduces the full duplex interactive function to the user.

In a possible implementation, in a voice playing process, a full duplex interactive mode may be referred to as a "geek mode", and the specific meaning of the "geek mode" may be explained, in order to make it easier for a user to understand. For example, a voice containing information for introducing a geek mode function may be played.

Figure 2:
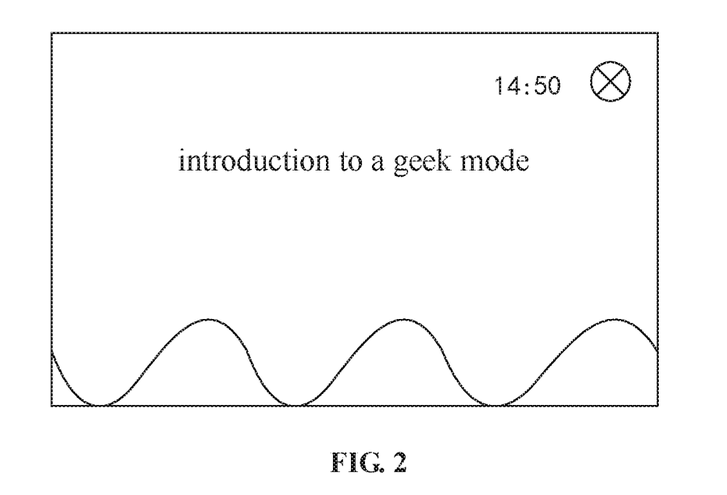
FIG. 2 is a schematic diagram showing a wave on a screen indicating that a voice interaction device is in a full duplex interactive state according to an embodiment of the present application.

For example, a voice such as "when a wave appears on the screen, it means that I am listening, you may talk to me directly" may be played, and a static image or a dynamic image of the wave may also be displayed on the screen when the voice is played. FIG. 2 is a schematic diagram showing a wave on a screen indicating that a voice interaction device is in a full duplex interactive state according to an embodiment of the present application. The wave in FIG. 2 may be static or dynamic. In an implementation, the wave may be displayed in a lower portion of the screen to avoid shielding other content on the screen.

In an example, a voice such as "you may talk to me, to instruct me to play a song, let's give it a try" may be played, so as to guide a user to try to use a full duplex interactive function. At this point, a voice interaction device is switched to a full duplex interactive state and waits for the user to issue a voice instruction.

In another example, a voice such as "if you want to activate a geek mode, please instruct me" may be played. That is to say, a voice containing information for recommending a full duplex interactive function may be played to the user.

Scenario 2: a current state of a voice interaction device is a full duplex interactive state, and current voice interactions between a user and the voice interaction device are multiple rounds of voice interaction with weak correlations. The current state of the voice interaction device is to be presented to the user. In the following, multiple rounds of voice interaction with strong correlations and multiple rounds of voice interaction with weak correlations are introduced first.

In the full duplex interactive state, voice interactions between a user and the voice interaction device may be categorized into two types, that is, multiple rounds of voice interaction with strong correlations and multiple rounds of voice interaction with weak correlations.

Multiple rounds of voice interaction with strong correlations refer to voice interactions, in which strong contextual logic relations exist between at least two adjacent rounds of voice interaction. For example, the following Dialogue One:

User: Set the alarm, please.
Device: What time do you want to set your alarm clock at?
User: 7 o'clock.
Device: 7 am or 7 pm?
User: 7 am.
Device: Set the alarm clock at 7 am. Done.

In the above voice interactions, three rounds of voice interaction occur, and strong contextual logic relations exist between adjacent rounds of voice interaction. Thus, the above voice interactions may be referred to as multiple rounds of voice interaction with strong correlations.

Multiple rounds of voice interaction with weak correlations refer to voice interactions, in which weak or no contextual logic relations exist between at least two adjacent rounds of voice interaction. For example, the following Dialogue Two:

User: How is the weather today?
Device: The weather is fine today.
User: I would like to watch a movie.
Device: Here's the latest movies recommended for you. (At the same time, the list of movie resources is displayed on the screen.)

During the above voice interactions, two rounds of voice interaction occur, and no contextual logic relation exists between the two adjacent rounds of voice interaction. Thus, the above voice interactions may be referred to as multiple rounds of voice interaction with weak correlations.

During multiple rounds of voice interaction with strong correlations, a voice interaction device directly asks a user questions and guides the user to participate in a conversation, and thus it is not necessary to present a current state of the voice interaction device to the user. In multiple rounds of voice interaction with weak correlations, the presenting the current state of the voice interaction device in the determined current presentation mode at S13 may include: playing a voice indicating that the voice interaction device is in the full duplex interactive state, in a case where a time interval between the current moment and the moment when the last round of voice interaction ends is greater than a first preset threshold; and/or playing a sound effect indicating that the voice interaction device is in the full duplex interactive state, in a case where a time interval between the current moment and the moment when the last round of voice interaction ends is greater than a second preset threshold.

Further, the presenting the current state of the voice interaction device in the determined current presentation mode at S13 may include displaying a static image and/or a dynamic image indicating that the voice interaction device is in the full duplex interactive state.

For example, during the above Dialogue Two, the device may display a static image and/or a dynamic image indicating that the voice interaction device is in a full duplex interactive state, after answering "the weather is fine today". For example, the device may display a static image or a dynamic video of a wave. Further, in a case where a time interval between the current moment and the moment when the last round of voice interaction ends is greater than a first preset threshold, the voice interaction device may play a voice indicating that the voice interaction device is in a full duplex interactive state, such as a voice of "What else do you need? You can tell me directly." Alternatively, in a case where a time interval between the current moment and the moment when the last round of voice interaction ends is greater than a second preset threshold, the voice interaction device may play a sound effect indicating that the voice interaction device is in the full duplex interactive state.

Scenario 3: a current state of a voice interaction device is a full duplex interactive state, and there is no current voice interaction between a user and the voice interaction device. In this scenario, the presenting the current state of the voice interaction device in the determined current presentation mode at S13 may further include: displaying a dynamic image and/or a static image indicating a remaining time of the voice interaction device in the full duplex interactive state, based on the remain time.

For ease of understanding, in the following, the mode for switching states of a voice interaction device is introduced first.

The state of a voice interaction device may be switched from a full duplex interactive state to a half-duplex interactive state, and vice versa. In the full duplex interactive state of a voice interaction device, if no voice instruction is received from a user within a predetermined time period, the state of the voice interaction device may be switched automatically from the full duplex interactive state to a half-duplex interactive state. If it is necessary to switch the state of a voice interaction device from a half-duplex interactive state to a full-duplex interactive state, a user needs to instruct the voice interaction device to switch, in a predetermined manner. For example, it is assumed that the predetermined time period is 8 seconds. If no voice instruction is received from a user within 8 seconds after the state of a voice interaction device is switched to a full duplex interactive state, the state of the voice interaction device is to be automatically switched to a half-duplex interactive state. If a voice instruction is received from the user within 8 seconds, a timer is restarted in response to the voice instruction.

Figure 3:
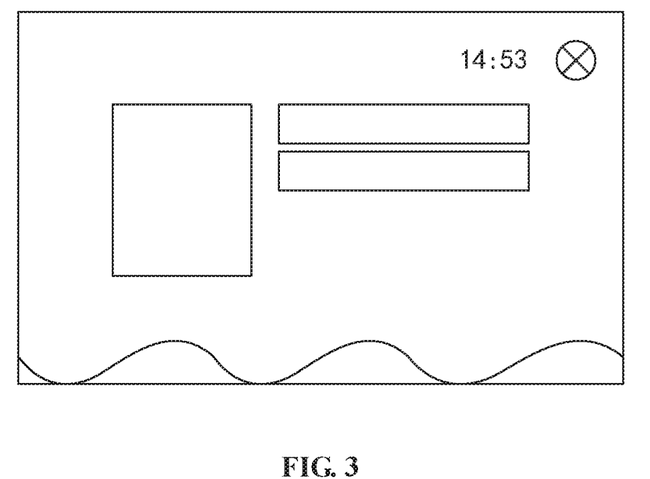
FIG. 3 is a schematic diagram showing a wave on a screen indicating that a full duplex interactive state is about to end according to an embodiment of the present application.

The dynamic image indicating the remaining time may be a progress bar, which is gradually shortened, or may be a wave line having a gradually decreasing amplitude, in order to indicate the meaning of "gradual reduction" or "about to end" to a user. FIG. 3 is a schematic diagram showing a wave on a screen indicating that a full duplex interactive state is about to end according to an embodiment of the present application. The amplitude of the wave in FIG. 3 is smaller than the amplitude of the wave in FIG. 2, and the amplitude of the wave in FIG. 3 continues to decrease over time, indicating that the full duplex interactive state is about to end.

For example, in a case where the state of a voice interaction device is just switched from a half-duplex interactive state to a full duplex interactive state, or in a case where a voice interaction between a user and the voice interaction device is just completed, a progress bar indicating the remaining time has the longest length. The length of the progress bar becomes shorter over time. For example, after 2 second, that is, 25% of the predetermined time period, the length of the progress bar may be 75% of its longest length. After 8 seconds, which is the predetermined time period, the length of the progress bar may be 0.

For another example, in a case where the state of a voice interaction device is just switched from a half-duplex interactive state to a full duplex interactive state, or in a case where a voice interaction between a user and the voice interaction device is just completed, a wave line indicating the remaining time has its maximum amplitude. The amplitude of the wave line gradually decreases over time. For example, after 6 second, that is, 75% of the predetermined time period, the current amplitude of the wave line may be 25% of its maximum amplitude. After 8 seconds, which is the predetermined time period, the amplitude of the wave line may be 0, that is to say, the wave line disappears.

Scenario 4: a current state of a voice interaction device is switched from a full duplex interactive state to a half-duplex interactive state. In this scenario, the presenting the current state of the voice interaction device in the determined current presentation mode at S13 may include: playing a voice and/or a sound effect indicating that the full duplex interactive state ends; or playing a voice and/or a sound effect indicating that the full duplex interactive state ends and a new full duplex interaction is prepared to be initiated.

For example, in a case where a full duplex interactive state of a voice interaction device ends, a voice such as "exit geek mode" may be played, and a sound effect indicating that the full-duplex interactive state ends may also be played simultaneously, so as to explicitly show a user that the full duplex interactive state ends. Then, a voice such as "if you want to activate a geek mode again, please instruct me" may further be played, so as to prompt the user that he may initiate a full duplex interaction again.

Scenario 5: a current state of a voice interaction device is a full duplex interactive state, and the voice interaction device is playing an audio file, such as playing music.

In this case, a user may directly provide a voice instruction, such as "play the next one", "move into my favorites", and the like. The voice interaction device is capable to identify the voice instruction provided by the user and make a response.

Figure 4:
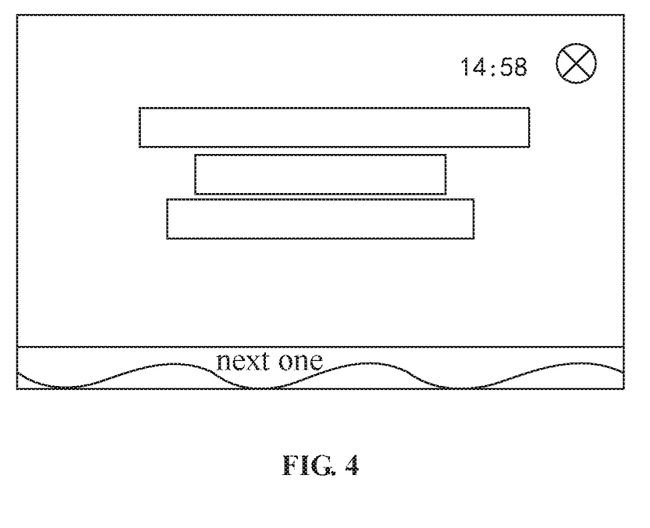
FIG. 4 is a schematic diagram showing a screen display of a voice interaction device upon receiving a user voice instruction, when the voice interaction device is playing music, according to an embodiment of the present application.

FIG. 4 is a schematic diagram showing a screen display of a voice interaction device upon receiving a user voice instruction, when the voice interaction device is playing music, according to an embodiment of the present application. In FIG. 4, a wave line indicating that the voice interaction device is in a full duplex interactive state is displayed in the lower portion of the screen. Upon receiving a voice instruction "play the next one" provided by a user, the voice instruction is converted into an associated text, and then the text (i.e., "next one") is displayed in the lower portion of the screen. Further, the voice interaction device plays the next music file in response to the voice instruction.

Scenario 6: a current state of a voice interaction device is a full duplex interactive state, and the voice interaction device is displaying a resource playlist or is playing a video file. In this case, a user may directly provide a voice instruction, such as "the next page", "play the next video", and the like. The voice interaction device is capable to identify the voice instruction provided by the user and make a response.

Figure 5:
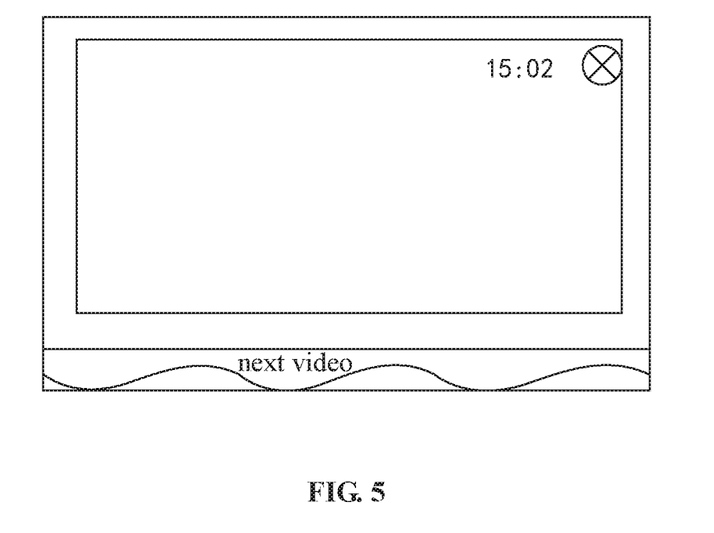
FIG. 5 is a schematic diagram showing a screen display of a voice interaction device upon receiving a user voice instruction, when the voice interaction device is playing a video file according to an embodiment of the present application.

FIG. 5 is a schematic diagram showing a screen display of a voice interaction device upon receiving a user voice instruction, when the voice interaction device is playing a video file according to an embodiment of the present application. In FIG. 5, the video file is displayed in the upper portion of the screen, and a wave line indicating that the voice interaction device is in a full duplex interactive state is displayed in the lower portion of the screen. Upon receiving a voice instruction "play the next video" provided by a user, the voice instruction is converted into an associated text, and then the text (i.e., "next video") is displayed in the lower portion of the screen. Further, the voice interaction device plays the next video file in response to the voice instruction.

In the above, implementations of presenting a current state of a voice interaction device to a user in different scenarios are described. The current state of a voice interaction device may be presented by means of a sound player or a video player of the voice interaction device. During the presenting, the operations being performed by the voice interaction device may not be affected. For example, when the voice interaction device is playing a video file, a static image or a dynamic image corresponding to the current state of the voice interaction device may be displayed at a position in the screen that does not obscure the video content. For another example, when the voice interaction device is playing an audio file, a voice or a sound effect corresponding to the current state of the voice interaction device may not be played. Instead, only a static image or a dynamic image corresponding to the current state of the voice interaction device may be displayed on the screen.

In the above, only some modes for presenting a state of a voice interaction device in a few of scenarios are described. Embodiments of the present application are not limited to the above scenarios. In other scenarios, the presentation modes provided by the embodiments of the present application may also be used to present a state of a voice interaction device.

Figure 6:
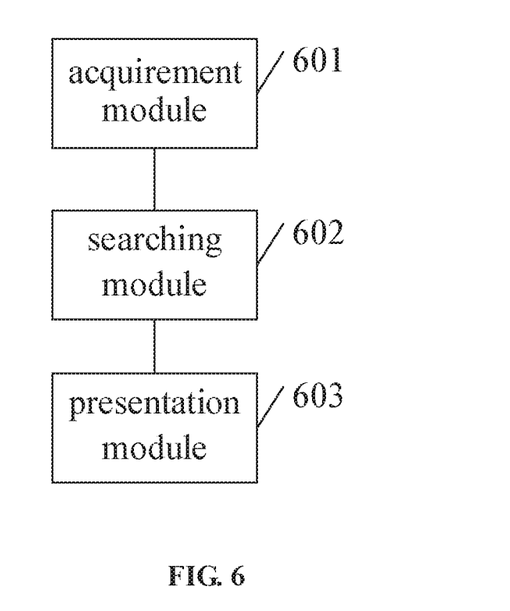
FIG. 6 is a schematic structural diagram showing an apparatus for presenting a state of a voice interaction device according to an embodiment of the present application.

An apparatus for presenting a state of a voice interaction device is provided according to an embodiment of the present application. FIG. 6 is a schematic structural diagram showing an apparatus for presenting a state of a voice interaction device according to an embodiment of the present application. As shown in FIG. 6, the apparatus includes: an acquirement module 601, configured to acquire a current state of the voice interaction device; a searching module 602, configured to determine a current presentation mode corresponding to the current state, by searching a pre-stored correspondence relation between a state and a presentation mode according to the current state; and a presentation module 603, configured to present the current state of the voice interaction device in the determined current presentation mode.

In a possible implementation, the presentation module 603 is configured to present the current state of the voice interaction device by at least one of: playing a voice, playing a sound effect, displaying a static image associated with a full duplex interactive state, and displaying a dynamic image associated with the full duplex interactive state.

In a possible implementation, in a case where the current state is a half-duplex interactive state and a full duplex interactive function is to be introduced, the presentation module 603 is configured to present the current state of the voice interaction device by at least one of: playing a voice containing information for introducing the full duplex interactive function; displaying a static image for showing the full duplex interactive state; displaying a dynamic image for showing the full duplex interactive state; and playing a voice containing information for recommending the full duplex interactive function.

In a possible implementation, in a case where the current state is a full duplex interactive state, the presentation module 603 is configured to play a voice indicating that the voice interaction device is in the full duplex interactive state, in a case where a time interval between the current moment and the moment when the last round of voice interaction ends is greater than a first preset threshold; and/or play a sound effect indicating that the voice interaction device is in the full duplex interactive state, in a case where a time interval between the current moment and the moment when the last round of voice interaction ends is greater than a second preset threshold.

In a possible implementation, in a case where the current state is a full duplex interactive state, the presentation module 603 is configured to display a static image and/or a dynamic image indicating that the voice interaction device is in the full duplex interactive state.

In a possible implementation, in a case where the current state is a full duplex interactive state, the presentation module 603 is configured to display a dynamic image and/or a static image indicating a remaining time of the voice interaction device in the full duplex interactive state, based on the remain time.

In a possible implementation, in a case where the current state is switched from a full duplex interactive state to a half-duplex interactive state, the presentation module 603 is configured to play a voice indicating that the full duplex interactive state ends; or play a voice indicating that the full duplex interactive state ends and a new full duplex interaction is prepared to be initiated.

In this embodiment, functions of modules in the apparatus refer to the corresponding description of the method mentioned above and thus a detailed description thereof is omitted herein.

Figure 7:
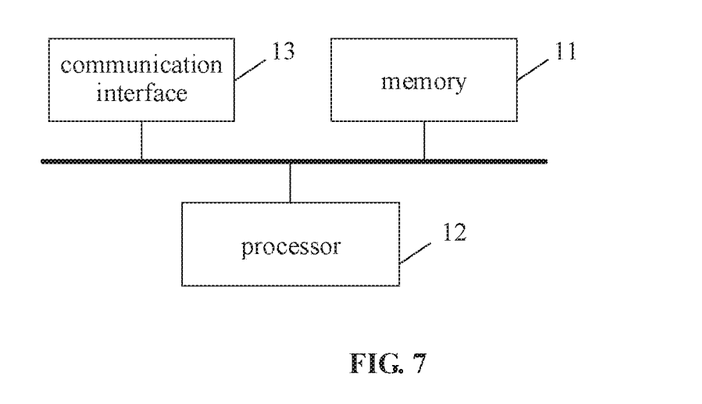
FIG. 7 is a schematic structural diagram showing a device for presenting a state of a voice interaction device according to an embodiment of the present application.

A device for presenting a state of a voice interaction device is provided according to an embodiment of the present application. FIG. 7 is a schematic structural diagram showing a voice for presenting a state of a voice interaction device according to an embodiment of the present invention. As showing in FIG. 7, the device includes a memory 11 and a processor 12, wherein a computer program that can run on the processor 12 is stored in the memory 11. The processor 12 executes the computer program to implement the method for presenting a state of a voice interaction device according to the foregoing embodiment. The number of either the memory 11 or the processor 12 may be one or more.

The device may further include a communication interface 13 configured to communicate with an external device and exchange data.

The memory 11 may include a high-speed RAM memory and may also include a non-volatile memory, such as at least one magnetic disk memory.

If the memory 11, the processor 12, and the communication interface 13 are implemented independently, the memory 11, the processor 12, and the communication interface 13 may be connected to each other via a bus to realize mutual communication. The bus may be an Industry Standard Architecture (ISA) bus, a Peripheral Component Interconnected (PCI) bus, an Extended Industry Standard Architecture (EISA) bus, or the like. The bus may be categorized into an address bus, a data bus, a control bus, and the like. For ease of illustration, only one bold line is shown in FIG. 7 to represent the bus, but it does not mean that there is only one bus or one type of bus.

Optionally, in a specific implementation, if the memory 11, the processor 12, and the communication interface 13 are integrated on one chip, the memory 11, the processor 12, and the communication interface 13 may implement mutual communication through an internal interface.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. The computer readable medium of the embodiments of the present application may be a computer readable signal medium or a computer readable storage medium or any combination of the above. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

In summary, in the method and apparatus for presenting a state of a voice interaction device according to embodiments of the present application, presentation modes corresponding to different states of a voice interaction device are pre-stored, a current presentation mode corresponding to a current state of the voice interaction device is determined, and the current state of the voice interaction device is presented in the determined current presentation mode. In this way, a current state of a voice interaction device is presented to a user, and necessary usage recommendations and prompts are also provided to the user, thereby improving user experience.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A computer program and computer processor implemented method for presenting a state of a voice interaction device, comprises:

acquiring, using a computer program executing on a computer processor, a current state of the voice interaction device;

determining, using a computer program executing on a computer processor, a current presentation mode corresponding to the current state, by searching a pre-stored correspondence relation between a state and a presentation mode according to the current state; and presenting, using a computer program executing on a computer processor, the current state of the voice interaction device in the determined current presentation mode, by at least one of: playing a voice, playing a sound effect, displaying a static image associated with a full duplex interactive state, and displaying a dynamic image associated with the full duplex interactive state, wherein in a case where the current state is the full duplex interactive state, the presenting the current state of the voice interaction device in the determined current presentation mode comprises at least one of:

in a case where a time interval between the current moment and the moment when the last round of voice interaction ends is greater than a first preset threshold, playing a voice indicating that the voice interaction device is in the full duplex interactive state; and in a case where a time interval between the current moment and the moment when the last round of voice interaction ends is greater than a second preset threshold, playing a sound effect indicating that the voice interaction device is in the full duplex interactive state.

2. The method for presenting a state of a voice interaction device according to claim 1, wherein in a case where the current state is a half-duplex interactive state and the full duplex interactive function is to be introduced, the presenting the current state of the voice interaction device in the determined current presentation mode comprises at least one of:

playing a voice containing information for introducing the full duplex interactive function;

displaying a static image for showing the full duplex interactive state;

displaying a dynamic image for showing the full duplex interactive state; and playing a voice containing information for recommending the full duplex interactive function.

3. The method for presenting a state of a voice interaction device according to claim 1, wherein in a case where the current state is the full duplex interactive state, the presenting the current state of the voice interaction device in the determined current presentation mode further comprises:

displaying a static image and/or a dynamic image indicating that the voice interaction device is in the full duplex interactive state.

4. The method for presenting a state of a voice interaction device according to claim 1, wherein in a case where the current state is the full duplex interactive state, the presenting the current state of the voice interaction device in the determined current presentation mode further comprises:

displaying a dynamic image and/or a static image indicating a remaining time of the voice interaction device in the full duplex interactive state, based on the remain time.

5. The method for presenting a state of a voice interaction device according to claim 1, wherein in a case where the current state is switched from the full duplex interactive state to a half-duplex interactive state, the presenting the current state of the voice interaction device in the determined current presentation mode comprises:

playing a voice indicating that the full duplex interactive state ends; or playing a voice indicating that the full duplex interactive state ends and a new full duplex interaction is prepared to be initiated.

6. An apparatus for presenting a state of a voice interaction device, comprising:

one or more processors; and a memory for storing one or more programs, wherein the one or more programs are executed by the one or more processors to enable the one or more processors to:

acquire a current state of the voice interaction device;

determine a current presentation mode corresponding to the current state, by searching a pre-stored correspondence relation between a state and a presentation mode according to the current state; and present the current state of the voice interaction device in the determined current presentation mode by at least one of: playing a voice, playing a sound effect, displaying a static image associated with a full duplex interactive state, and displaying a dynamic image associated with the full duplex interactive state, wherein in a case where the current state is the full duplex interactive state, the one or more programs are executed by the one or more processors to enable the one or more processors to at least one of:

in a case where a time interval between the current moment and the moment when the last round of voice interaction ends is greater than a first preset threshold, play a voice indicating that the voice interaction device is in the full duplex interactive state; and in a case where a time interval between the current moment and the moment when the last round of voice interaction ends is greater than a second preset threshold, play a sound effect indicating that the voice interaction device is in the full duplex interactive state.

7. The apparatus for presenting a state of a voice interaction device according to claim 6, wherein in a case where the current state is a half-duplex interactive state and the full duplex interactive function is to be introduced, the one or more programs are executed by the one or more processors to enable the one or more processors to present the current state of the voice interaction device by at least one of:

playing a voice containing information for introducing the full duplex interactive function;

displaying a static image for showing the full duplex interactive state;

displaying a dynamic image for showing the full duplex interactive state; and playing a voice containing information for recommending the full duplex interactive function.

8. The apparatus for presenting a state of a voice interaction device according to claim 6, wherein in a case where the current state is the full duplex interactive state, the one or more programs are executed by the one or more processors to enable the one or more processors further to display a static image and/or a dynamic image indicating that the voice interaction device is in the full duplex interactive state.

9. The apparatus for presenting a state of a voice interaction device according to claim 6, wherein in a case where the current state is the full duplex interactive state, the one or more programs are executed by the one or more processors to enable the one or more processors further to display a dynamic image and/or a static image indicating a remaining time of the voice interaction device in the full duplex interactive state, based on the remain time.

10. The apparatus for presenting a state of a voice interaction device according to claim 6, wherein in a case where the current state is switched from the full duplex interactive state to a half-duplex interactive state, the one or more programs are executed by the one or more processors to enable the one or more processors to play a voice indicating that the full duplex interactive state ends; or play a voice indicating that the full duplex interactive state ends and a new full duplex interaction is prepared to be initiated.

11. A non-transitory computer-readable storage medium, in which a computer program is stored, wherein the computer program, when executed by a processor, causes the processor to:

acquire a current state of a voice interaction device;

determine, by searching a pre-stored correspondence relation between a state and a presentation mode according to the current state, a current presentation mode corresponding to the current state; and present the current state of the voice interaction device in the determined current presentation mode by at least one of: playing a voice, playing a sound effect, displaying a static image associated with a full duplex interactive state, and displaying a dynamic image associated with the full duplex interactive state, wherein in a case where the current state is the full duplex interactive state, presenting the current state of the voice interaction device in the determined current presentation mode comprises at least one of:

in a case where a time interval between the current moment and the moment when the last round of voice interaction ends is greater than a first preset threshold, playing a voice indicating that the voice interaction device is in the full duplex interactive state; and in a case where a time interval between the current moment and the moment when the last round of voice interaction ends is greater than a second preset threshold, playing a sound effect indicating that the voice interaction device is in the full duplex interactive state.

* * * * *